United States Patent [19]

Nishimatsu et al.

[11] Patent Number: 4,701,375

[45] Date of Patent: Oct. 20, 1987

[54] MAGNETIC RECORDING MEDIUM

[75] Inventors: Masaharu Nishimatsu, Komoro; Suguru Takayama, Tokyo; Hiroyuki Arioka, Saku, all of Japan

[73] Assignee: TDK Corporation, Tokyo, Japan

[21] Appl. No.: 922,752

[22] Filed: Oct. 24, 1986

Related U.S. Application Data

[63] Continuation of Ser. No. 696,355, Jan. 1, 1983, abandoned.

[30] Foreign Application Priority Data

Feb. 1, 1984 [JP] Japan .................................. 59-15258
Feb. 1, 1984 [JP] Japan .................................. 59-15259

[51] Int. Cl.$^4$ .......................... G11B 5/71; G11B 5/72
[52] U.S. Cl. ...................................... 428/336; 427/44; 427/131; 427/132; 427/54.1; 427/128; 428/694; 428/695; 428/900
[58] Field of Search ............... 428/694, 328, 900, 695, 428/336, 323; 427/44, 128, 131, 132, 54.1; 360/134–136

[56] References Cited

U.S. PATENT DOCUMENTS

| | | | |
|---|---|---|---|
| 4,171,399 | 10/1979 | Allen | 428/447 |
| 4,309,482 | 1/1982 | Suzuki | 428/900 |
| 4,368,239 | 1/1983 | Nakajima | 427/128 |
| 4,414,271 | 11/1983 | Kitamoto | 427/128 |
| 4,425,404 | 1/1984 | Suzuki | 428/900 |
| 4,486,500 | 12/1984 | Naruo | 428/900 |
| 4,499,138 | 2/1985 | Yamamoto | 428/695 |
| 4,501,795 | 2/1985 | Takeuchi et al. | 428/694 X |
| 4,514,451 | 4/1985 | Suzuki | 428/141 |
| 4,526,837 | 7/1985 | Ohtsuki et al. | 428/694 X |
| 4,536,444 | 8/1985 | Sumiya | 428/695 |
| 4,537,832 | 8/1985 | Kohmoto | 427/131 |
| 4,540,627 | 9/1985 | Ishizawa et al. | 428/328 |
| 4,548,873 | 10/1985 | Yamamoto et al. | 252/62.54 X |
| 4,557,948 | 12/1985 | Yamamoto | 427/130 |
| 4,587,150 | 5/1986 | Nishimatsu | 427/44 |
| 4,588,656 | 5/1986 | Kitamoto | 427/44 |
| 4,618,535 | 10/1986 | Nishimatsu | 427/44 |
| 4,618,537 | 10/1986 | Takano | 428/694 |
| 4,621,008 | 11/1986 | Takasugi | 427/131 |
| 4,624,892 | 11/1986 | Ishizaki | 428/900 |

FOREIGN PATENT DOCUMENTS

0121519  6/1985  Japan .................................. 428/695

*Primary Examiner*—Ellis P. Robinson
*Attorney, Agent, or Firm*—Wyatt, Gerber, Shoup, Scobey and Badie

[57] ABSTRACT

A magnetic recording medium, comprising a non-magnetic substrate, a magnetic recording layer of ferromagnetic film formed on one side of said substrate, and a topcoat layer comprising an antioxidant and a lubricant and formed on the surface of said magnetic recording layer.

7 Claims, No Drawings

MAGNETIC RECORDING MEDIUM

This application is a continuation of Ser. No. 696,355, filed on Jan. 1, 1983, now abandoned.

BACKGROUND OF THE INVENTION

1. Field of the Invention:

This invention relates to a magnetic recording medium, and more particularly to a magnetic recording medium having as a magnetic recording layer a ferromagentic film excelling in travelling stability and durability.

2. Description of Prior Art:

Today, magnetic recording media are extensively used in audios, videos, computers and magnetic disks. In consequence of the growth of their utility, volumes of information to be stored in the magnetic recording media are incessantly expanding year after year. The desirability of these magnetic recording media possessing improved recording density, therefore, is commanding growing recognition.

The non-binder type magnetic recording medium, i.e. the magnetic recording medium formed of a ferromagnetic film, which enjoys easier reduction of wall thickness and higher saturation magnetization than the coating type magnetic recording medium problems with respect to corrosion, impact, and frictional strength. It has the possibility of sustaining wear or even breakage owing to the high-speed motion it is required to produce relative to the magnetic head during the recording, replaying, and erasing of magnetic signals. To be more specific, since the magnetic recording medium provided with a ferromagnetic film produced by such a method as electroplating, non-electrolytic plating, spattering, vacuum evaporation or ion plating contains no binder therein, it has the possibility of yielding the magnetic recording layer thereof to excoriation or destruction due to the friction which the magnetic recording medium generates during its sliding contact with the magnetic head.

The magnetic recording medium which consists of a ferromagnetic.film has a surface susceptible of corrosion. As the corrosion advances, it deteriorates the practical properties of the magnetic recording medium such as head touch and wear resistance and manifests and adverse effect on the electromagnetic conversion property thereof as well.

A method which provides for applying a lubricant on the surface of the magnetic metal film (Japanese patent publication No. SHO 39(1964)-25246) has been proposed as a solution. This method, however, fails to provide durable surface lubrication as expected because the lubricant on the surface is wiped away by the magnetic head, for example. Naturally this method cannot be expected to impart rustproofness, durability, etc. to the treated film.

As means of continuously furnishing the surface of the magnetic recording layer with lubrication, there has been proposed a method which provides for in forming on the opposite side of the magnetic recording layer a lubricating layer (backcoat layer) composed principally of a liquid or semisolid lubricant and an organic binder (Japanese patent publication No. SHO 57(1982)-29769). This method supposedly manifes excellent effect with respect to changes of durability (degree of scratching and excoriation) and dynamic friction coefficient because the lubricant exuding to the rear surface of the magnetic recording layer passes into the magnetic recording layer when it is wound in a roll and ensures constant supply of the lubricant to the surface of the magnetic recording layer. When the ferromagnetic film is not provided with a topcoat layer and only the backcoat layer is allowed to contain the lubricant as contemplated by this method, the level of friction between the magnetic film and the magnetic head is still high enough to impair the smoothness of travel of the magnetic film and the resistance of the magnetic film to corrosion and rusting is not adequate.

An object of this invention, therefore, is to provide a novel magnetic recording medium.

Another object of this invention is to provide a ferromagnetic film type mangetic recording medium improved in resistance to wear, durability and travelling property.

SUMMARY OF THE INVENTION

The objects described above are accomplished by this invention providing a magnetic recording medium which comprises a non-magnetic substrate, a magnetic recording layer formed of a ferromagnetic film deposited on one side of the substrate, and a topcoat layer composed of an antioxidant and a lubricant and deposited on the surface of the aforementioned magnetic recording layer.

This invention is also directed to a magnetic recording medium using an antioxidant of the type cured by radiaiton. It is further directed to a magnetic recording medium provided on the opposite side with a backcoat layer formed of a coating material containing an inorganic pigment, an organic binder, and a lubricant. This invention is directed to a magnetic recording medium using as the organic binder for the backcoat layer a resin of the type cured by radiaiton. This invention is also directed to a magnetic recording medium using as the antioxidant a phosphoric ester of the type cured by radiation. Further this invention is directed to a magentic recording medium using as the lubricant for both the topcoat layer and the backcoat layer a lubricant of the type cured by radiation.

As described previously, the magnetic recording medium which. has the lubricant applied only on the surface of the ferromagentic film fails to provide continuous supply of the lubricant. In the case of the magentic recording medium which causes the lubricant contained in the backcoat layer to be fed to the ferromagnetic film through back-side transfer, although continuous supply of the lubricant may be obtained, the lubricant in the backcoat layer is transferred on the back side to the ferromagnetic film lacking a topcoat. This transfer of the lubricant to the ferromagnetic film bare of a topcoat poses no serious problem to the magnetic recording medium incorporating no oxygen in the vacuum deposited film (oxygen-free metallic film; Japanese patent publication No. SHO 57(1982)-29769). In the case of the magnetic recording medium which permits incorporation of oxygen by the vacuum deposition method prevailing today (oxygen-containing metallic film), however, the transfer of the lubricant in the manner described above deprives the ferromagnetic film of its stability possibly to the extent of inducing adverse effects such as, for example, loss of output, clogging of pores, failure to reproduce image, and generation of heavy frictional resistance. Thus, the magnetic recording medium offers poor performance. In an extreme case, the film may be separated from the substrate or even destroyed. Particularly during the still measurement, the film may be torn off the substrate and the fragments may clog the recording device.

The present invention has solved all these problems by offering the magnetic recording medium constructed as described above.

DESCRIPTION OF PREFERRED EMBODIMENT

Examples of the ferromagnetic metal or ferromagnetic alloy advantageously used for the ferromagnetic film in this invention include iron, cobalt, nickel and other ferromagnetic metals, and ferromagnetic alloys such as Fe—Co, Fe—Ni, Co—Ni, Fe—Rh, Fe—Cu, Fe—Au, Co—Cu, Co—Au, Co—Y, Co—La, Co—Pr, Co—Gd, Co—Sm, Co—Pt, Ni—Cu, Fe—Co—Nd, Mn—Bi, Mn—Sb and Mn—Al.

The ferromagnetic film can be formed by applying the aforementioned metal or alloy directly, or indirectly through the medium of a non-magnetic thin layer, on any of the conventional substrates such as polyester film, polyamide film and other plastic films, aluminum sheet, stainless steel plate and other metallic plates, and glass plates and other layers of inorganic material by a suitable method such as vacuum depostion, spattering, ion plating or electroplating.

Any of the methods described above can be adopted for the production of the ferromagentic film of the present invention. Nevertheless, the method of current wide prevalence (2) which effects the deposition of the film under a vacuum of $\sim 1 \times 10^4$ Torr on a substrate inclined (90° to 30°) in the longitudinal direction and not in the lateral direction under continuous flow of $O_2$ or a mixture of $O_2$ and Ar is adopted more advantageously than the method (1) indicated in Example 5 of Japanese patent publication No. SHO 57(1982)-29769 which effects the deposition under a vacuum of $5.0 \times 10^{-6}$ Torr on a substrate laterally inclined by 50° relative to the source of evaporation.

The vacuum deposited film produced by method (1) described above is in a metallic state throughout the entire surface (except for the surface which is spontaneously oxidized after transfer into the atmosphere), whereas the film of metal or alloy deposited under a vacuum containing a very small amount of oxygen according to method (2) contains oxygen in the ferromagnetic metal film. This oxygen avoids forming a solid solution with the metal and remains in the form of an oxide. The presence of this oxide is highly desirable for the magentic recording medium. It has been ascertained to the inventors that properties desirable for the present invention are obtained particularly when this oxide richly occurs in the boundary between the film and the substrate and on the surface of the magnetic recording medium opposite the substrate.

The incorporation of oxygen into the ferromagnetic metal film can be effected not only by performing the aforementioned vacuum deposition in the presence of oxygen but also by vacuum depositing a film in the absence of oxygen and subjecting the film to forced oxidation in an atmosphere at 90° C. and 20% of RH, for example, thereby forming the surface of the substrate and the surface on the opposite side solely with oxide.

The oxygen content of the oxygen-containing ferromagnetic film is in the range of 3 to 60%, in terms of oxygen atom/magnetic atom)×100.

The magnetic recording layer of the present invention has formed on the surface of the ferromagnetic film a topcoat layer containing an antioxidant and a lubricant.

When the magnetic recording layer is formed solely of the ferromagnetic film and is not provided with a topcoat layer, the magnetic recording medium experiences high level of friction, lacks travelling stability, and exhibits inferior durability even if the backcoat layer thereof contains a lubricant. In the vacuum deposited film of the type lacking a topcoat layer, the vacuum deposited film produced by the method of vacuum deposition prevailing today is known to contain oxygen as described above. This vacuum deposited film excels the oxygen-free vacuum deposited film in terms of resistance to corrosion, resistance to magentism, and electromagnetic conversion property. It is not greatly improved in resistance to friction with the magnetic head and is deficient in travelling stability and durabilty. Moreover, the lubricant in the backcoat layer exudes and passes on the back side into the vacuum deposited film possibly so much as to damage the film and jeopardize the stability of output and induce loss of output, clogging of pores, failure to reproduce image, and impaired stability of friction level. In an extreme case, the film may be separated from the substrate or even broken. Particularly during still measurement, the film may be fractured or separated from the substrate and the fragments may cause clogging of the recording device. It has been found that mere inclusion of a lubricant in the backcoat layer as taught in Japanese patent publication No. SHO 57(1982)-29769 is not sufficient for the production of a satisfactory magnetic recording medium. As a technical solution, the present invention contemplates provision of a specific topcoat layer.

The topcoat layer of the present invention contains an antioxidant and a lubricant.

The antioxidant for use in the present invention is required only to prevent a metal from oxidation. This invention, therefore, does not require a specific antioxidant.

Thus, any of the antioxidants in general use can be employed in the present invention. Structurally, these antioxidants are broadly classified as (1) phenol type antioxidants, (2) amine type antioxidants, (3) phosphorus type antioxidants, (4) sulfur type antioxidants, (5) organic acid, alcohol and ester type antioxidants, (6) quinone type antioxidants, and (7) inorganic acid and inorganic salt type antioxidants.

Now, concrete examples of these various types of antioxidants will be cited below.

(1) Examples of phenol type antioxidants include 2,6-di-tert-butyl p-cresol, 2,6-di-tert-butyl phenol, 2,4-dimethyl-6-tert-butyl phenol, butyl hydroxyanisol, 2,2'-methylene-bis(4-methyl-6-tert-butyl phenol), 4,4-butylidene-bis(3-methyl-6-tert-butyl phenol), 4,40 -thio-bis(3-methyl-6-tert-butyl phenol), tetrakis[methylene-3(3,5-di-tert-butyl-4-hydroxyphenyl)pripionate]methane, 1,1,3-tris(2-methyl-4-hydroxyl-5-tert-butylphenyl)butane, dibutylhydroxy toluene, propyl gallate, guaiacum resin, and nordihydroguaiaretic acid. Examples of radiation curable phenol type anitoxidants include methacrylates and acrylates of monoglycolsalicylate, 2,5-di-tert-butyl hydroquinone, 2,4-dihydroxy benzophenone, 2,4,5-trihydroxybutylophenone and hydroquinone.

(2) Examples of amine type antioxidants include phenyl-β-naphthylamine, α-naphthylamine, N,N'-di-sec-butyl p-phenylenediamine, phenothiazine and N,N'-diphenyl-p-phenylenediamine. Alkanolamines and phospholipids are other examples. In the amine type antioxidants, dimethylaminoethyl methacrylate and acrylate and other similar antioxidants are examples of the amine type anitoxidants, which are curable by radiation.

(3) The phosphorus type antioxidants which are usable herein are divided under two types, i.e. the radiation curable type and the non-radiation curable type. Examples of the substituents, R, for phosphoric ester moieties of these phorphorus type antioxidants are alkyl groups, alkylphenyl groups, ethylene oxide and propylene oxide. These substituents, R, will preferably contain 1 to 26 carbons atoms, preferably 1 to 22 carbon atoms. The phosphoric esters are divided under three forms, i.e. mono, di and tri forms. The substituents of tri form may be in a cut configuration. Further, phosphoric esters also include those of NH4 type, methacrylate type and acrylate type. Concrete examples are phosphorous esters such as triphenyl phosphite, trioctadecyl phosphite, tridecyl phosphite and trilauryl trithiophosphite, and phosphoric esters such as hexamethyl phosphoric triamide, butyl phosphate, cetyl phosphate, butoxyethyl phosphate, 2-ethylhexyl phosphate, β-chloroethyl phosphate, butoxyethyl phosphate diethylamine salt, di(2-ethylhexyl) phosphate, ethylene glycol acid phosphate, (2-hydroxyethyl) methacrylate phosphate, butylhydroxy methacrylate phosphate, caprylhydroxy methacrylate phosphate, myristylhydroxy methacrylate phosphate, stearylhydroxy methacrylate phosphate, acetylhydroxy methacrylate phosphate, butylphenyhydroxy methacrylate phosphate, amylphenylhydroxy methacrylate phosphate and nonylphenylhydroxy methacrylate phosphate, acrylates thereof, phenyl phosphate and other alcohols thereof, nonylphenyl and other phenyl phosphates thereof, and vanadium type acid phosphoric esters.

(4) Examples of sulfur type antioxidants include dilauryl thiodipropionate, distearyl thiodipropionate, laurylstearyl thiodipropionate, dimyristyl thiodipropionate, distearyl-β,β'-thiodibutylate, 2-mercaptobenzoimidazole and dilauryl sulfide. Methacrylates and acrylates of 4,4'-thio-bis(3-methyl-6-tert-butyl phenol) and 2,2'-thio-bis(4-methyl-6-tert-butyl phenol) which are curable by radiation are other examples. These sulfur type antioxidants may contain ethylene oxide and propylene oxide.

(5) Examples of organic acid, alcohol and ester type antioxidants include sorbitol, glycerol, propylene glycol, adipic acid, citric acid and ascorbic acid. They may be of the type curable by radiation.

(6) Examples of quinone type antioxidants iclude hydroquinone and tocopherol. They may be of the type curable by radiation.

(7) Inorganic acid and inorganic salt type antioxidants are represented by phosphoric acid.

In the antioxidants enumerated above, those possessing an acryl type double bond in the molecular units and belonging to the type curable by radiation are preferred since they are capable of curbing back-side transfer of lubricant into the ferromagnetic film. Examples of the antioxidants satifying this requirement include monoglycol salicylate methacrylate (acrylate), 4-tert-butyl catechol methacrylate (acrylate), dimethylaminoethyl methacrylate (acrylate), ethylhydroxy methacrylate (acrylate) phosphate, cetylhydroxy phosphate methacrylate (acrylate) and stearyl methacrylate (acrylate) phosphate, and phenyl analogs thereof, 2,2'-thio-bis(-4methyl-6-tert-butyl phenol)methacrylate (acrylate). Particularly radiation curable type phosphoric esters are desirable examples. These phosphoric esters are produced by any of the methods known to the art. The method disclosed in Japanese patent application Laid-open No. SHO 57(1982)-44223 is one example. When the antioxidant is of the type curable by radiation, since the topcoat layer can be cured on the ferromagnetic film in the on-line operation, the back-side transfer due to shrinkage during thermal curing and the consequent deterioration of surface property and the degradation of output are not entailed. The topcoat for the ferromagnetic film functions advantageously at a thickness of not more than 800 Å. If the thickness exceeds this level, the electric property of the topcoat is lowered. If this thickness is too large, since the surface coarseness of the ferromagnetic film is not more than 100 Å, the layer of the antioxidant which overlies the ferromagnetic film gains in thickness so much as to be scraped. All these behaviors have been unveiled for the first time by present invention. This invention improves such properties as curbing dropout and reducing output difference of recording medium due to location in the roll and effects with respect to treatment as enabling on-line production.

The lubricant to be used in this invention can be selected from among various lubricants heretofore developed for use in magnetic recording media of the class. Examples are silicone oil, fluorine oil, fatty acids, fatty esters, paraffins, liquid paraffins and surfactants. Among other lubricants, fatty acids and/or fatty esters prove particualrly suitable.

Concrete examples of fatty acids are caprylic acid, capric acid, lauric acid, myristic acid, palmitic aicd, stearic acid, behenic acid, oleic acid, elaidic acid, linolinic acid, linoleic acid and stearolic acid which have not less than 12 carbon atoms (RCOOH, R denoting an alkyl group of at least 11 carbon atoms). Fatty esters which are advantageously used herein are those formed of monobasic fatty acids of 12 to 16 carbon atoms and monohydric alcohols of 3 to 12 carbon atoms and those formed of monobasic fatty acids of not less than 17 carbon atoms and monohydric alcohols having a sufficient number of carbon atoms as to give totals of 21 to 23 carbon atoms including those of the aforementioned fatty acids.

Silicones which are advantageously used herein are those modified with fatty acids, and those partially modified with fluorine. Alcohols available as lubricants are higher alcohols. Fluorine oils advantageously usable herein are those produced by electrolytic substitution, telomerization, oligomerization, etc.

Some of the lubricants enumerated above may be used advantageously as prepared in the type curable by radiation. Since these lubricants curb back-side transfer to the ferromagnetic film, they prove advantageous in the sense that they preclude dropout, reduce output difference of recording medium due to location in the roll, and permit on-line production.

The lubricant of the radiation curable type is a compound which contains a molecular chain exhibiting a slipping property and an acrylic double bond within the molecular unit. Concrete examples of the compound include acrylic esters, methacrylic ester, vinyl acetic ester, acrylic acid amide type compounds, vinyl alcohol esters, methylvinyl alcohol ester, allyl alcohol esters and glycerides. In structural formula, these lubricants are expressed as follows:

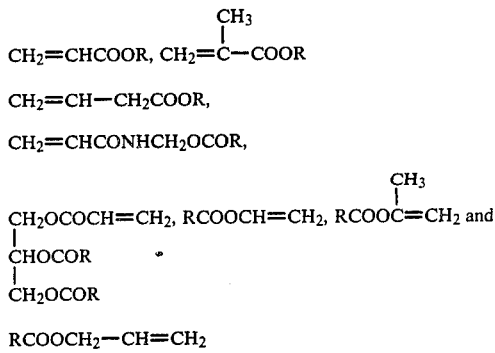

$CH_2=CH-CH_2COOR$, $CH_2=CHCONHCH_2OCOR$,

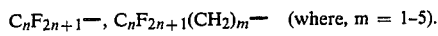

$RCOOCH_2-CH=CH_2$

In the formulas given above, R denotes a straight or branched, saturated or unsaturated hydrocarbon group having not less than 7 carbon atoms, preferably not less 12 and not more than 23 carbon atoms. They may be used as substituted with fluorine. The products of fluorine substitution are as follows.

$C_nF_{2n+1}-$, $C_nF_{2n+1}(CH_2)_m-$ (where, m = 1–5).

$C_nF_{2n+1}SO_2\overset{R}{N}CH_2CH_2-$, $C_nF_nCH_2CH_2NCH_2CH_2-$, and

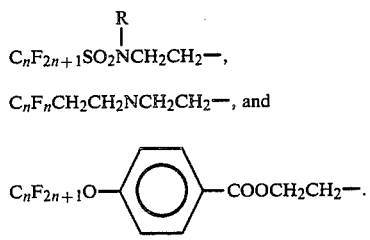

Concrete examples of the radiation curable type lubricant are methacrylate (acrylate) of stearic acid, methacrylate (acrylate) of stearyl alcohol, methacrylate (acrylate) of glycerol, methacrylate (acrylate) of glycol, and methacrylate (acrylate) of silicone.

In the topcoat layer, the amount of the lubricant contained is 0.5 to 100 parts by weight, preferably 1 to 50 parts by weight, based on 100 parts by weight of the antioxidant.

The topcoat layer containing the antioxidant and the lubricant can be formed on the surface of the ferromagnetic film by diluting the aforementioned additives with a solvent and applying the resultant solution in a thin layer on the ferromagnetic film or by vaporizing the additives in the atmosphere of air or inert gas or in a vacuum and causing the produced vapor to impinge upon the surface of the ferromagnetic metal.

The thickness of the topcoat layer is desired to fall in the range of 10 to 800 Å. If the topcoat layer is too thick, it may suffer from inferior electrical property and yield itself to the possibility of being scraped. If it is too thin, it may clog. The ferromagnetic film bare of the topcoat is desired to be not more than 100 Å. It has been found that if the coarseness is too large, the topcoat layer superposed on the ferromagnetic film entail the possibility of being scraped. If the coarseness is too small, the topcoat layer may adhere to the ferromagnetic film with insufficient fastness and clog. The criticality of the thickness of the topcoat layer described above has been found for the first time in this invention. The thickness is preferred to fall in the range of 10 to 300 Å.

The magnetic recording medium of the present invention manifests its effect more advantageously when it is additionally provided with a backcoat layer on the side of the substrate opposite the recording layer.

The backcoat layer used for this invention contains an inorganic pigment, an organic binder and a lubricant.

Examples of inorganic pigment include (1) carbon black and graphite which possess electroconductivity and (2) inorganic fillers such as $SiO_2$, $TiO_2$, $Al_2O_3$, $Cr_2O_3$, SiC, CaO, $CaCO_3$, zinc oxide, goethite, $\alpha-Fe_2O_3$, talc, kaolin, $CaSO_4$, boron nitride, graphite fluoride, molybdenum disulfide and ZnS. Among other inorganic pigments enumerated above, $CaCO_3$, kaolin, ZnO, goethite, ZnS and carbon are advantageously used. The amount of the inorganic pigment to be used is desired to fall in the range of 20 to 200 parts by weight in the case of the material of the group (1) or in the range of 10 to 300 parts by weight in the case of the material of the group (2) respectively based on 100 parts by weight of the binder. If the amount of the inorganic pigment is too large, the produced coat gains excessively in brittleness and induces the possibility of increasing dropout.

As the lubricant (inclusive of dispersant), any of the substances heretofore adopted in the preparation of backcoat layers of the class can be used. Examples of the lubricant include fatty acids of not less than 12 carbon atoms (RCOOH, R denoting an alkyl group of not less than 11 carbon atoms) such, palmitic acid, stearic acid, behenic acid, oleic acid, elaidic acid, linolinic acid, linolec acid and stearolic acid; metallic soaps formed of alkali metals (such as Li, Na and K) or alkaline earth metals (such as Mg, Ca and Ba) and the aforementioned fatty acids; an lecithin. Besides these, higher alcohols of not less than 12 carbon atoms, sulfuric esters thereof, surfactants, titanium coupling agent, and silane coupling agent are also usable. The amount of the lubricant (dispersant) to be added is in the range of 1 to 20 parts by weight, based on 100 parts by weight of the binder.

Other examples of the lubricant include silicone oil, graphite, molybdenum disulfide, tungsten disulfide, fatty esters formed between monobasic fatty acids of 12 to 16 and monohydric alcohols of 3 to 12 carbon atoms, and fatty esters formed between monobasic fatty acids of not less than 17 carbon atoms and monohydric alcohols of so many carbon atoms giving totals of 21 to 23 carbon atoms including those of the aforementioned fatty acids. The lubricant from this group is added in an amount falling in the range of 0.2 to 20 parts by weight based on 100 parts by weight of the binder.

Any of the other additives which are added to backcoat layers of the class can be used for the backcoat layer of this invention. Examples of antistatic agents include natural surfactants such as saponin, nonionic surfactants of alkylene oxide type, glycerol type and glycidol type; cationic sufactants such as higher alkylamines, quaternary ammonium salts, pyridine and other similar heterocyclic compounds, phosphoniums and sulfoniums; anionic surfactants containing carboxylate groups, sulfonate groups, phosphate groups, sulfuric ester groups and phosphoric ester groups; and amphoteric surface active agents such as amino acids, aminosulfonic acids and sulfuric and phosphoric esters of amino alcohols.

As the organic binder for use in the backcoat layer of the present invention, any of the thermoplastic resins, thermosetting resins and reactive resins, and their mixtures which have been heretofore used in magnetic recording media can be adopted. From the standpoint of the strength of the coat to be produced, the organic binder is desired to be a thermosetting resin particularly of the type curable by radiation.

The termoplastic resin is desired to have a softening point of not more than 150° C., and average molecular weight of 10,000 to 200,000, and a polymerization degree of about 200 to 2,000. Examples of the thermoplastic resin satisfying the requirement include vinyl chloride-vinyl acetate copolymer (including a modification containing a carboxylic acid), vinyl chloride-vinyl acetate-vinyl alcohol copolymer (including a modification containing a carboxylic acid), vinyl chloride-vinylidene chloride copolymer, vinyl chloride-acrylonitrile copolymer, acrylic ester-acrylonitrile copolymers, acrylic ester-vinylidene chloride copolymers, acrylic ester-styrene copolymers, methacrylic ester-acrylonitrile copolymers, methacrylic ester-styrene copolymers, urethane elastomers, nylon-silicon type resins, nitrocellulose-polyamide resin, polyvinyl fluoride, vinylidene chloride-acrylonitrile copolymer, butadiene acrylonitrile copolymer, polyamide resins, polyvinyl butyral, cellulose derivatives (such as cellulose acetate, cellulose diacetate, cellulose triacetate, cellulose propionate and nitrocellulose), styrene-butadiene copolymer, polyester resins, chlorovinyl ether-acrylic ester copolymers, amino resins, various synthetic rubber type thermoplastic resins, and mixtures thereof.

The thermosetting resin or reactive resin, in the form of a coating liquid, possesses a molecular weight of not more than 200,000. The resin in this form, when applied on a substrate, dried and heated, undergoes a reaction of condensation or addition and acquires an infinite molecular weight. The resin is desired not to soften or melt before it is thermally decomposed. Concrete examples of the resin satisfying the requirement include phenol resin, epoxy resin, polyurethane setting resin, urea resin, melamine resin, alkyd resin, silicone resin, acrylic reactive resin, epoxy-polyamide resin, nitrocellulose-melamine resin, mixtures of high molecular polyester resins with isocyanate prepolymer, mixtures of methacrylate copolymers with diisocyanate prepolymer, mixtures of polyester polyols with polyisocyanate, ures formaldehyde resin, mixtures of lower molecular glycol with high molecular diols and triphenylmethane triisocyanate, polyamine resin and mixtures thereof.

Desirable resins are thermoplastic resins (using a curing agent) formed by various combinations of cellulosic resins (such as nitrocellulose), vinyl chloride-vinyl acetate-vinyl alcohol copolymer, and urethane and resins of the type curable by radiation formed by various combinations of vinyl chloride-vinyl acetate-vinyl alcohol copolymer (including a modification containing a carboxylic acid) or acryl-modified vinyl chloride-vinyl acetate-vinyl alcohol copolymer (including a modificaiton containing a carboxylic acid) and urethane acrylate. Besides the desirable combinations described above, there can be used those resins which are produced by incorporating into the molecules of thermoplastic resins such groups as acrylic double bonds of free radical polymerizable acrylic acid, methacrylic acid, and esters thereof possessing unsaturated double bonds, allyl double bonds such as of diallyl phthalate, and unsaturated bonds such as of maleic acid and maleic acid derivatives which are crosslinked or polymerized with drying by radiation. Other binder components usable herein include such monomers as acrylic acid, methacrylic acid and acrylamide. Examples of the binder having a double bond are various polyesters, polyols, and polyurethanes modified with compounds possessed of acryl double bonds. Optionally, polyhydric alcohols and polycarboxylic acids may be combined to produce binders of varying molecular weights. The resins enumerated above constitute only a small fraction of radiation-curing resins. They may be used as suitably combined. Preferably, the organic binder is formed by combining (A) a plastic compound having at least two unsaturated double bonds and a molecular wieght for 5,000 to 100,000 and curable by radiation, (B) a rubbery compound possessing at least one unsaturated double bond and curable by radiaiton or having a molecular weight of 3,000 to 100,000 and not curable by radiation, and (C) a compound having at least one unsaturated double bond and a molecular weight of 200 to 3,000 and curable by radiation in the proportions of 20 to 70% by weight of (A), 20 to 80% by weight of (B), and 10 to 40% by weight of (C). In consequence of the use of the organic binder thus formed, the applied coat acquires enhanced tenacity through improvement in strength at rupture and the backcoat layer strongly resists scraping and there is substantially no passage of inorganic filler powder to the magnetic layer. Thus, the magnetic recording medium consequently produced will experience dropout minimally, avoid shrinking when cured in a rolled state, and manifest uniformity of quality in the longitudinal direction.

In the manufacture of the magnetic recording medium of the present invention, the organic binder of thermosetting type proves undesirable because the lubricant in the backcoat layer is transferred on back side into the magnetic film during the course of the manufacture and, consequently, the produced magnetic recording medium lacks stability of travelling, induces decline of output, failure to reproduce image, and persistence of high friction level. In an extreme case, the back-side transfer may result in excoriation or fracture of the ferromagnetic film. The idea of effecting the formation of the topcoat layer at the outset of manufacture may be conceived as a possible solution to the problem. More often than not, this practice proves inconvenient because the formed topcoat is liable to scratch during the subsequent steps of manufacture. Further in the case of the organic binder of thermosetting type, the transfer of the exudate from the backcoat layer during the shrinkage of the roll possibly impairs the uniformity of electromagnetic conversion property in the inner portion and the outer portion of a jumbo roll during the course of curing under heat.

In contrast, in the case of the radiation curable type resin, the resin can be cured continuously and quickly without entailing the aforementioned back-side transfer of the exudate and the consequent dropout during the manufacture of the magnetic recording medium. Moreover, the curing by radiation and the formation of the topcoat layer can both be effected by an on-line operation, a fact which greatly contributes to saving of energy and labor and to reduction of cost as well. In terms of properties, the possible dropout due to the shrinkage of the roll during the curing under heat and the loss of uniformity of output in the longitudinal direction of the magnetic tape due to variation of pressure applied to the roll in the inner portion and the outer portion of the roll are precluded.

With respect to the aforementioned components (A), (B) and (C) which make up the radiation-curing resin binder, the component (A) used alone lacks flexibility and exhibits brittleness, the component (B) used alone lacks elasticity, the combination of the components (A) and (B) exhibits high breaking energy, enjoys improvement in embrittling energy only to a limited extent, possesses low rigidity, shows increased viscosity under conditions of high temperature and high humidity, and offers high static friction. In contrast, the combination of the components (A) and (B) plus the component (C) acquires enhanced cross-linking property, enjoys improvement in tensile strength, breaking energy, and embrittling energy, prevents the backcoat from excoriation, and imparts high tenacity to the produced coat. The produced coat shows no increase in viscosity, retains low friction coefficient, and produces no distortion in the reproduced image after 5 days' standing under harsh conditions of 50° C. and 80% RH. Evidently, the addition of the component (C) gives enhanced cross-linking property and increased rigidity to the backcoat layer. Owing to the addition of the component (C) to the combination of the components (A) and (B), the lowest possible molecular weight of the component (A) in the combination is allowed to be lower than that in the combination of the components (A) and (B). This is because the component (A) which is plastic in constitution is enabled by the incorporation of the component (C) to acquire improvement in plasticity and rigidity and give rise to an applied coat abounding with viscoelasticity and embrittling energy.

If, in the radiation curable resin binder of the present invention, the molecular weight of the component (A) is less than 5,000 and that of the component (B) is less than 3,500, the applied coat to be obtained is so hard for the backcoat layer to undergo heavy scraping and suffer from insufficiency of electromagnetic conversion property. If the molecular weight of the component (A) exceeds 100,000, the electromagnetic conversion property is lowered because of insufficient dispersion of this component. If the component (B) of such large molecular weight happens to be of the type curable by radiation, the properties are still lower and the strength is further decreased. The molecular weight of the component (A) is desired to fall in the range of 10,000 to 80,000, that of the component (B) in the range of 3,000 to 80,000, that of the component (C) in the range of 200 to 2,500 respectively. The component (B) is desired to be of the type curable by radiation because the component of this type serves to increase cross-linking property and enhance the coat strength.

In the combination of the components (A), (B) and (C), the mixing ratio of the component (A) is in the range of 20 to 70% by weight, preferably 30 to 70% by weight, that of the component (B) in the range of 20 to 80% by weight, preferably 20 to 60% by weight, and that of the component (C) in the range of 10 to 40% by weight, preferably 10 to 30% by weight.

The molecular weights of the compounds of (A), (B) and (C) as reported herein are number-averaged molecular weights determined by the following method.

* Determination of average molecular weight of binder by GPC:

GPC (gel permeation chromatography) is a method which separates molecules of a given specimen by the size of such molecules in the mobile phase of the specimen. Specifically, this method comprises subjecting the specimen to liquid chromatography using a column packed with a porous gel serving as a molecular sieve. In preparation for the calculation of average molecular weight, polystyrene of a known molecular weight adopted as a standard specimen is subjected to the liquid chromatography and a calibration curve is drawn by using the time of elution of the adsorbate. Based on the calibration curve, the average molecular weight of a give compound is calculated as reduced to polystyrene.

On the assumption that in a given high molecular substance, the number of molecules of a molecular weight of Mi is Ni, the number averaged molecular weight, Mn, of this substance can be expressed as follows.

$$Mn = \Sigma NiMi / \Sigma Ni$$

In the combination of the components (A), (B) and (C) for use in this inveniton, the number of unsaturated double bonds per molecule is at least 2, preferably at least 5, in the component (A), at least 1, preferably at least 5, in the component (B), and at least 1, preferably at least 3, in the component (C).

The plastic compound to be used as the component (A) in this invention is required to have at least two unsaturated double bonds in the molecular chain and to be capable of generating radicals and consequently producing a cross-linked structure on exposure to radiation. This compound may be obtained by modifying a corresponding thermoplastic resin so as to be sensitized to radiation.

Concrete examples of the radiation-curing resin are those resins having incorporated in the molecules of thermoplastic resins such groups as acryl type double bonds present as in acrylic acid, methacylic acid, and esters thereof possessed of radically polymerizable unsaturated double bonds, allyl type double bonds present as in diallyl phthalate, and unsaturated bonds present as in maleic acid and maleic acid derivatives which undergo cross-linking or polymerization with drying on exposure to radiation. Otherwise, they are compounds which are possessed of unsaturated double bonds capable of cross-linking polymerization on exposure to radiation. They are required to have molecular weights in the range of 5,000 to 100,000, preferably 10,000 to 80,000.

The resins which contain in the molecules of thermoplastic resin those groups enabled by exposure to radiation to undergo cross-linking or polymerization with drying embrace the following unsaturated polyester resins.

The unsaturated polyester resins are polyester compounds containing radiation-curable double bonds within the molecular chains thereof, i.e. unsaturated polyester resins containing radiation curable unsaturated double bonds and having part of polybasic acid moieties thereof converted into maleic acid with a saturated polyester resin formed by the esterification of a polybasic acid indicated in (2) below and a polyhydric alcohol. Such a radiation curable unsaturated polyester resin as described above can be produced by addding maleic acid or fumaric acid to at least one polybasic acid component and at least one polyhydric alcohol component, subjecting the resultant mixture to a treatment for removal of water or alcohol by an ordinary procedure, i.e. in the presence of a catalyst at 180° to 200° C. in an atmosphere of nitrogen gas, and the causing condensation of the reaction product at an elvated temperature of 240° to 280° C. under a vacuum of 0.5 to 1 mmHg. For the convenience of the crosslinking and the curing upon radiation during the manufacture, the content of maleic acid or fumaric acid is required to fall in the range of 1 to 40 mol%, preferably 10 to 30 mol%, based on the total acid content.

Examples of the thermoplastic resin modifiable into the radiation curable resin are as follows:

(1) Vinyl chloride type copolymers

Vinyl chloride-vinyl acetate-vinyl alcohol copolymer, vinyl chloride-vinyl alcohol copolymer, vinyl chloride-vinyl alcohol-vinyl propionate copolymer, vinyl chloride-vinyl acetate-maleic acid copolymer and vinyl chloride-vinyl acetate-terminal OH side chain alkyl group copolymer. Commercially avaiable vinyl chloride type copolymers are produced by Union Carbide Corp. and marketed under trademark designations VROH, VYNC, VYEGX and VERR, for example.

The copolymers enumerated above undergo the radiation-sensitizing modification when they are caused to incorporate therein an acrylic double bond, a maleic acid double bond, or an allyl type double bond by a method to be described afterward.

(2) Saturated polyester resins

Saturated polyester resins to be obtained by the reaction of such saturated polybasic acids as phthalic anhydride, isophthalic acid, terephthalic acid, succinic acid, adipic acid and sebacic acid with such polyhydric alcohols as ethylene glycol, diethylene glycol, glycerol, trimethylol propane, 1,2-propylene glycol, dipropylene glycol, 1,3-butane diol, 1,4-butane diol, 1,6-hexane diol, pentaerythritol, sorbitol, neopentyl glycol and 1,4-cyclohexane dimethanol. Resins obtained by modifying those saturated polyester resins mentioned above such as with SO$_3$Na (Bylon 53S, for example) are also examples. They are caused to undergo the radiation-sensitizing modification by the same method.

(3) Polyvinyl alcohol type resins

Polyvinyl alcohol, butyral resin, acetal resin, formal resin and copolymers thereof. These resins also may have their hydroxyl group subjected to the radiation-sensitizing modification by the same method.

(4) Epoxy type resins and phenoxy type resins

Epoxy resins obtained by the reaction of bisphenol A with epichlorohydrin or methyl epichlorohydrin (such as products of Shell Chemical marketed under trademark designations of Epikote 152, 154, 828, 1001, 1004 and 1007, products of Dow Chemical marketed under trademark designations of DEN 431, DER 732, DER 511 and DER 331, and products of Dainippon Ink And Chemicals, Inc. marketed under trademark designations of Epicron 400 and Epicron 800), phenoxy resins which are high polymer resins of the aforementioned epoxy (such as products of Union Carbide marketed under trademark designations of PKHA, PKHC and PKHH), and copolymers of brominated bis-phenol A with epichlorohydrin (such as products of Dainippon Ink And Chemicals, Inc. marketed under trademark designations of Epicron 145,152,153 and 1120). These resins also may be subjected to the radiation-sensitizing modification by virtue of their epoxy group.

(5) Cellulose derivatives

Cellulose derivatives of varying molecular weights are also effectively used as thermoplastic components. Among other cellulose derivatives, nitrocellulose, cellulose acetobutyrate, ethyl cellulose, butyl cellulose and acetyl cellulose prove-particularly desirable. They also may be subjected to the radiation-sensitizing modification by virtue of their hydroxyl group by the same method.

Other polyfunctional polyester resins, polyether ester resins, polyvinyl pyrrolidone resin and derivatives thereof (such as vinyl pyrrolidone-olefin copolymer), polyamide resin, polyimide resin, phenol resin, spiroacetal resin and hydroxyl group-containing acrylic and methacrylic resins are also usable for the purpose of the radiation-sensitizing modification.

The compound (B) having a high molecular weight used in the present invention may be a thermoplastic elastomer, prepolymer or a radiation-sensitized elastomer or prepolymer, and the latter is more effective.

Examples of the elastomer or prepolymer usable advantageously for the purpose of this invention are as follows.

(1) Polyurethane elastomers and prepolymers

Polyurethane elastomers are particularly effective in terms of wear resistance and adhesiveness to polyethylene terephthalate film.

Examples of such urethane compounds are polyurethane elastomers and prepolymers formed of polycondensates of various isocyanates such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphynylene diisocyanate, hexamethylene diisocyanate, isophorone diisocyanate, dicyclohexylmethane diisocyanate, Desmodur L and Desmodur N; linear saturated polyesters (such as polycondensates of polyhydric alcohols such as ethylene glycol, diethylene glycol, glycerol, trimethylol propane, 1,4-butane diol, 1,6-hexane diol, pentaerythritol, sorbitol, neopentyl glycol and 1,4-cyclohexane dimethanol with saturated polybasic acids such as phthalic anhydride, isophthalic acid, terephthalic acid, maleic acid, succinic acid and adipic acid); linear saturated polyethers (such as polyethylene glycol, polypropylene glycol and polytetramethylene glycol), and various polyesters such as caprolactam, hydroxyl-containing acrylates and hydroxyl-containing methacrylates.

Such elastomers may be combined in their unaltered form with the aforementioned thermoplastic resin modified for radiation-sensitization. The elastomer may be used more effectively, however, when it is modified for radiation-sensitization by reaction with an acrylic double bond capable of reacting with the isocyanate group or hydroxyl group at the terminal of the polyurethane elastomer or with a monomer possessing such an acrylic double bond.

(2) Acrylonitrile-butadiene copolymer elastomers

The acrylonitrile-butadiene copolymer prepolymer having a terminal hydroxyl group produced by Sinclar Petrochemical Corp. and marketed under trademark designation of Poly-BD Liquid Resin and the elastomers produced by Nippon Geon Co., Ltd. and marketed under trademark designations of Hiker 1432J, etc. are particularly suitable as elastomer components because the double bonds in their butadiene moieties are capable of generating radicals and inducing cross-linking and polymerization upon exposure to radiation.

(3) Polybutadiene elastomers

The prepolymers having a low molecular terminal hydroxyl group produced by Sinclare Petrochemical Corp. and marketed under trademark designations of Poly-BD-Liquid Resin R-15, etc. are highly suitable in terms of compatibility with termoplastic resins. In the prepolymer, R-15, since a hydroxyl group forms the terminal of the molecule, this prepolymer can be made to acquire improved sensitivity to radiation by addition of an acrylic unsaturated double bond to the molecular terminal. The prepolymer thus modified proves more advantageous as a binder.

Further, the cyclized polybutadiene (produced by Japan Synthetic Rubber Co., Ltd. and marketed under trademark designation of CBR-M 901) manifests an outstanding behavior when properly combined with a thermoplastic resin.

In the class of other thermoplastic elastomers and their prepolymers, preferred members are elastomers such as styrene-butadiene rubber, chlorinated rubber, acrylic rubber, isobutylene rubber and cyclization product therof (such as the product of Japan Synthetic Rubber Co., Ltd. marketed under trademark designation of CIR 701), epoxy-modified rubber, and internally plasticized saturated linear polyester (such as the product of Toyo Spinning Co., Ltd. marketed under trademark designation of Byron 190 300). They may be effectively utilized when they are for radiation-sentizing modification.

Typical compounds (C) having radiation curable unsaturated double bond used in the present invention are styrene, ethyl acrylate, ethyleneglycol diacrylate, ethylene glycol dimethacrylate, diethyleneglycol diacrylate, diethyleneglycol dimethacrylate, 1,6-hexyleneglycol diacrylate, 1,6-hexyleneglycol dimethacrylate, trimethylolpropane triacrylate, trimethylolpropane trimethacrylate, polyfunctional oligoester acrylate (produced by Toa Gosei Kagaku and marketed under trademark designation of Aronix M-7100), acryl modified urethane elastomer (Nippolan 4040) and a functional group such as COOH introduced compounds thereof.

Now, typical syntheses of radiation-sensitive binders will be cited below.

(a) Synthesis of acryl-modified vinyl chloride-vinyl acetate copolmer type resin (radiation-sensitive modified resin)

In a four-necked flask having an inner volume of 5 liters, 750 parts of partially saponified vinyl chloride-vinyl acetate copolymer (average polymerization degree n=500), 1250 parts of toluene, and 500 parts of cyclohexanone were dissolved by heating. The resultant solution was heated to 80°C., then mixed with 61.4 parts of 2-hydroxyethyl methacrylate adduct of tolylene diisocyanate, further mixed with 0.012 part of tin octylate and 0.012 part of hydroquinone. The resultant mixture was heated at 80° C. under a current of N₂ for the reaction to proceed until the conversion of NCO reached 90%. After the reaction, the reaction mixture was cooled and diluted with 1250 parts of methyl ethyl ketone.

Method for preparation of 2-hydroxyethyl methacrylate (2HEMA) adduct of tolylene dissocyanate (TDI)

Under a current of N₂, 348 parts of tolylene diisocyanate was heated to 80° C. in a four-necked flask having an inner volume of 1 liter. While the internal temperature of a reaction can be controlled in the range of 80° to 85r20 C. by cooling, 260 parts of 2-hydroxyethyl methacrylate, 0.07 part of tin octylate and 0.05 part of hydroquinone were added dropwise. After completion of the addition, the contents of the reaction can were stirred at 80° C. for three hours to bring the reaction to completion. After completion of the reaction, the reaction mixture was removed from the reaction vessel and then cooled. Consequently, there was obtained a white pasty 2-HEMA of TDI.

(b) Synthesis of acryl modified butyral resin (radiationr-sensitive modified resin)

In a four-necked flask having an inner volume of 5 liters, 100 parts of butyral resin (produced by Sekisui Chemical and marketed under trademark designation of BM-S), 191.2 parts of toluene and 71.4 parts of cyclohexanone were dissolved by heating and heated to 80° C. The resultant solution was mixed with 7.4 parts of 2-hydroxyethyl methacrylate adduct of tolylene diisocyanate and further with 0.015 part of tin octylate and 0.015 part of hydroquinone. The resultant mixture was heated at 80° C. under a current of N₂ for the reaction to proceed until the conversion of NCO reached more than 90%. After completion of the reaction, the reaction mixture was cooled and then diluted with methylethyl ketone.

(c) Synthesis of acryl-modified saturated polyester resin (radiation sensitive modified resin)

In 116 parts of toluene and 116 parts of methylethyl ketone, 100 parts of a saturated polyester resin (Bylon RV-200 made by Toyo Spinning Co.) was dissolved by heating. The resultant solution was heated to 80° C., mixed with 3.55 parts of 2 HEMA adduct of TDI and then with 0.007 part of tin octylate and 0.007 part of hydroquinone. The resultant mixture was heated at 80° C. under a current of N₂ for the reaction to proceed until the conversion of NCO reached above 90%.

(d) Synthesis of acryl-modified epoxy resin (radiation-sensitive modified resin)

In 50 parts by toluene and 50 parts of methylethyl ketone, 400 parts of an epoxy resin (Epikote 1007 made by Shell Chemical) was dissolved by heating. The resultant solution was combined with 0.006 part of N,N-dimethylbenzyl amine and 0.003 part of hydroquinone and heated to 80° C. with 69 parts of acrylic acid added dropwise thereto. The resultant mixture was heated at 80° C. for the reaction to proceed until the acid number fell below 5.

Synthesis of acryl-modified phenoxy resin (radiation-sensitive modified resin)

In a four-necked flask having an inner volume of 3 liters, 600 parts of phenoxy resin having OH group (PKHH made by UCC, molecular weight 30,000) and 1800 parts of methylethyl ketone were charged and dissolved by heating. The resultant solution was heated to 80° C., mixed with 6.0 parts of 2HEMA adduct of TDI and then with 0.012 part of tin octylate and 0.012 part of hydroquinone. The resultant mixture was heated at 80° C. under a current of N₂ for the reaction to proceed until the conversion of NCO reached above 90%. The modified phenoxy has 35,000 of molecular weight and 1 double bond per molecule.

(e) synthesis of acryl-modified urethane elastomer (radiacurable elastomer)

In a reaction vessel, 250 parts of a diphenylmethane diisocyanate (MDI) type urethane prepolymer having terminal isocyanate groups (made by Nippon Polyurethane and marketed under trademark designation of Nippolan 4040), 32.5 parts of 2 HEMA, 0.07 part of hydroquinone, and 0.009 part of tin octylate were dissolved by heating. With the internal temperature of the reaction tank kept by cooling in the range of to 80° C., to 90° C., 43.5 parts of TDI was added dropwise. After completion of the addition, the resultant reaction mixture was heated at 80° C. for the reaction to proceed until the conversion of NCO reached above 95%.

(f) Synthesis of acryl-modified polyether type terminal urethane-modified elastomer (radiation-sensitive elastomer)

In a reactionr vessel, 250 parts of Polyether PTG-500 (made by Nippon Polyurethane), 32.5 parts of 2HEMA, 0.007 part of hydroquinone, and 0.009 part of tin octylate were dissolved by heating at 80° C. To the resultant solution, 43.5 parts of TDI was added dropwise, with the internal temperature of the reaction controlled by cooling in the range of 80° to 90° C. After completion of the dropwise addition, the resultant mixture was heated at 80° C. for the reaction to proceed until the conversion NCO reached above 95%.

(g) Synthesis of acryl-modified polybutadiene elastomer (radiation-sensitive elastomer)

In a reaction vessel 250 parts of a low molecular terminal hydroxyl group polybutadiene poly-BD liquid resin R-15 made by Sinclare Petrochemical Company, 32.5 parts of 2 HEMA, 0.007 part of hydroquinone and 0.009 part of tin octylate were dissolved by heating at 8° C. To the resultant solution, 43.5 parts of TDI was added dropwise with the internal temperature of the reaction controlled by cooling within the range of 80° to 90° C. After completion of the addition, the resultant mixture was kept at 80° C. for the reaction to proceed until the conversion of NCO reached above 95%.

Besides aforementioned products of modification, high polymers which are disintegrated on exposure to radiation and high polymers which undergo intermolecular cross-linking on exposure to radiation are known in the art. Examples of high polymers which under to intermolecular crosslinking include polyethylene, polyproplene, polystyrene, polyacrylic esters, polyacryliamide, polyvinl chloride, polyesters, polyvinyl pyrrolidone rubber, polyvinyl alcohol and polyacrolein. These corsslinking polymers can be used in their unaltered form as radiosensitive backcoating resins because they are crosslinked without being modified as described above.

Further non-solvent type resins which do not require a solvent can be quickly cured by the method described above. Thus, these resins can be used as backcoating materials.

Preferably, the radiation curable resin composition of the present invention is obtained by combining (A) a partially saponified vinyl chloride-vinyl acetate copolymer, a vinyl chloride-vinyl acetate copolymer incorporating a carboxylic acid, or a compound produced by causing a polyisocyanate compound to react upon phenoxy resin thereby forming a compound possessing an isocyanate group and then causing this compound to react with an acrylic compound or methacrylic compound possessing a functional group capable of reacting with the isocyanate group, (B) a compound produced by causing an isocyanate compound to react upon a polyol and allowing the isocyanate compound or polyol (polyurethane elastomer) resulting from the reaction to react with an acrylic compound or methacrylic compoound possessing a functional group capable of reacting with the polyurethane elastomer, and (C) a polyfunctional (meth)acrylate monomer, an oligoester acrylate, or a lower molecular analog of the component (B).

When the organic binder used in the backcoat layer and the lubricant and the antioxidant used in the topcoat layer or backcoat layer of the present invention are of the type curable by radiation, the activating energy source to be used for the cross-linking is selected from among the electron beam issuing from a radiation accelerator, the gamma ray issuing from Co 60, the beta ray issuing from Sr 90, the X- ray issuing from an X-ray generator, and the ultraviolet light.

From the standpoint of control of the dosage of radiation, introduction of the radiation into the production line, and interception of ionizing radiation, the use of radiation from a radiation heater proves particularly advantageous.

The radiation to be used in curing the backcoat layer and the topcoat layer is derived advantageously from a radiation accelerator rated at 100 to 750 KV, preferably 150 to 300 KV, of acceleration voltage high enough for through transmission of the radiation through the layers. The operation of this radiation accelerator is required to give the layers a dosage of 0.5 to 20 megarads.

For example, a low-dosage type radiation accelerator (electro-curtain system) produced by Energy Science Corp. of the U.S. or its equivalent proves convenient for the curing of the aforementioned layers in this invention because it is readily incorporated in the tape coating line and it warrants perfect protection of the accelerator interior against secondary X-ray.

The Van de Graaff accelerator heretofore utilized extensively as a radiation accelerator can also be used as the source for the radiation.

For the layers to be cured by the radiation as expected, it is important that the backcoat layer and the topcoat layer should be exposed to the radiation under a current of an inert gas such as $N_2$ gas or He gas. The exposure of these layers to the radiation in the presence of air is highly disadvantageous because the ozone generated by the radiation during the cross-linking of the binder component impedes the radical formed in the polymer from promoting the cross-linking reaction. It is, therefore, imperative that the exposure of the layers to the activating energy ray should take place in the atmosphere of an inert gas such as $N_2$, He or $CO_2$, with the maximum oxygen concentration held down below 5% at all cost.

Optionally, the topcoat layer of this invention may incorporate therein a photopolymerization sensitizer so as to be cured by ultraviolet light. Any of the photopolymerization sensitizers heretofore known to the art can be used for this purpose. Examples of the photopolymerization sensitizer include benzoins such as benzoin methyl ether, benzoin ethyl ether, $\alpha$-methyl benzoin and $\alpha$-chlorodeoxybenzoin, ketones such as benzophenone, acetophenone and bis-dialkylaminobenzophenone, quinones such as anthraquinone and phenanthraquinone, and sulfides such as benzyl disulfide and tetramethyl thiuram monosulfide. The photopolymerization sensitizer is preferably used in an amount in the range of 0.1 to 10% by weight, based on the resin solids.

In the formation of the thermally curable backcoat surface during the manufacture of the magnetic recording medium, the formation of the backcoat surface prior to that of the magnetic surface proves undesirable because the thermal curing treatment of the backcoat surface causes shrinkage of the substrate and consequent decline of the surface coarseness of the substrate. To avoid the trouble, this thermal treatment is usually carried out after the formation of the magnetic surface. Thus, the backcoat is normally deposited on the reverse side of the substrate after the magnetic coat has been formed on the obverse side of the substrate. In accordance with this invention, since the shrinkage of the backcoat surface is precluded by the use of the radiation curable binder and since the curing is attained in an on-line operation, the order in which the formation of the topcoat and that of the backcoat is immaterial.

The magnetic recording medium of the present invention can be utilized as audio tape, video tape, computer tape, endless tape, magnetic disk and magnetic camera. It is used particularly conveniently as video tape and computer tape for which the phenomenon of dropout constitutes one of the most important properties.

High-performance tapes having excellent electromagnetic conversion property and highly reliable quality and useful for contact transfer printing master tapes for high-bias HiFi audio cassette tape, video cassette tape, and video tapes which manifest remarkable technical advance and finding growing demand can be obtained by combining the backcoat layer using the radiation curable binder and the magnetic recording layer of metallic film provided with the topcoat layer containing the antioxidant and the lubricant as contemplated by this invention. The magnetic recording medium of this invention truly manifest outstanding usefulness.

Now, the present invention will be described more specifically below with reference to working examples. It should be noted that this invention is not limited in any sense to these working examples.

EXAMPLE 1-9 AND CONTROLS 1-5

(1) Formation of Magnetic Layer

Ferromagnetic film 1

By advancing a polyester film 12 $\mu$m in thickness over the peripheral surface of a cylindrical cooling roll, melting an alloy of Co 80% and Ni 20% inside a chamber swept with a mixture of $O_2$ and Ar (1:1 by volume ratio) introduced at a flow rate of 800 cc per minute and kept under a vacuum of $1.0 \times 10^{-4}$ Torr, and allowing the incoming polyester film to be vacuum deposited with the alloy vapor within 90° to 30° of angle of incidence, there was formed a Co—Ni—O film 0.15 $\mu$m in thickness. Oxygen was deposited heavily in the boundary between the metal film and the substrate and on the opposite side of the substrate. The opposite surface of the substrate was covered substantially wholly with an oxide. Hc=1000 Oe. The average oxygen content of the film, expressed in the atomic ratio relative to Co and Ni, thus (O/CoNi)×100, was 40%.

Ferromagnetic film 2

A film having a thickness of 0.15 $\mu$m and formed substantially of Co and Ni was produced by subjecting a polyester film 12 $\mu$m in thickness to the procedure used for the production of the ferromagnetic film 1 as described above, except that the vacuum inside the chamber was changed to $5.0 \times 10^{-6}$ Torr.

The tape was subjected to forced oxidation in an atmosphere kept at 90° C. and 20% RH to cover the opposite surface of the substrate wholly with an oxide. Hc=900 Oe. The average oxygen content of the film was 45% by atomic ratio relative to Co and Ni.

Ferromagnetic film 3

A film having a thickness of 0.15 $\mu$m and formed substantially of Co and Ni was produced by subjecting a polyester film 12 $\mu$m in thickness to the procedure used for the production of the ferromagnetic film 2 as described above, except that the step for oxidation with oxygen was omitted. Hc=950 Oe.

Ferromagnetic film (Control)

A polyethylene terephthalate substrate 12 $\mu$m in thickness and ½ inch in width was advanced under a vacuum of $4.0 \times 10^{-6}$ Torr as inclined by 50° relative to the source for evaporation and an alloy of Co 75 and Ni 25 (by weight ratio) was vacuum deposited on the substrate. Consequently, there was obtained a magnetic film having a thickness of 0.2 $\mu$m and exhibiting magnetic properties, 420 Oe in antimagnetic force and 0.80 in square ratio, in the longitudinal direction of the substrate.

(2) Formation of topcoat layer

| Topcoat 1 | |
|---|---|
| | Parts by weight |
| Butyl (2) hydroxymethacrylate phosphate (mixture of mono and di forms) | 2 |
| Fluorine-modified silicone stearate | 0.4 |
| MEK | 100 |

A topcoat composition shown above was applied on the ferromagnetic film 1 and irradiated under the conditions of 150 KeV, 6 mA, and 3 Mrads in an atmosphere of $N_2$ gas to give rise to a topcoat 50 Å in thickness.

| Topcoat 2 | |
|---|---|
| | Parts by weight |
| Ethyl (3) hydroxymethacrylate phosphate (mixture of mono, di, and tri forms) | 3 |
| Stearic acid | 0.5 |
| Stearic acid-modified silicone | 0.5 |
| Toluene/ethanol (9/1) | 100 |

A topcoat composition shown above was applied on the ferromagnetic film 1 under the same conditions as those used for the topcoat 1 to give rise to a topcoat 100 Å in thickness.

| Topcoat 3 | |
|---|---|
| | Parts by weight |
| Stearyl (2) hydroxyacrylate phosphate (mixture of mono and di forms) | 5 |
| Acrylate of stearic acid | 1 |
| MEK/toluene (1/1) | 100 |

A topcoat composition shown above was applied on the ferromagnetic film 2 under the conditions of 150 KeV, 10 mA, and 5 Mrads in an atmosphere of $N_2$ gas to give rise to a topcoat 300 Å in thickness.

| Topcoat 4 | |
|---|---|
| | Parts by weight |
| Nonylphenyl (1) hydroxymethacrylate phosphate (mixture of mono and di forms) | 3 |
| Benzoin ethyl ether | 1 |
| MEK/toluene (1/1) | 100 |

A topcoat composition shown above was applied on the ferromagnetic film 1 under an ultraviolet lamp (output 80 W and available length 1 cm) at a line speed of 30 m per minute, to give rise to a topcoat 100 Å A in thickness.

| Topcoat 5 | |
|---|---|
| | Parts by weight |
| Nonylphenyl (2) hydroxymethacrylate phosphate amine (mixture of mono and di forms) | 5 |
| Benzophenone | 2 |

-continued

Topcoat 5

The magnetic recording media so produced were tested for properties. The results are shown in Table 1 below.

TABLE 1

| Example | E1 | E2 | E3 | E5 | E6 | E7 | E8 | E9 | C1 | C2 | C3 | C4 | C5 |
|---|---|---|---|---|---|---|---|---|---|---|---|---|---|
| Ferromagnetic film | 1 | 1 | 1 | 1 | 1 | 2 | 3 | 3 | 1 | 2 | 3 | 4 | 1 |
| Topcoat | 1 | 2 | 4 | 6 | 7 | 3 | 5 | 8 | none | none | none | none | 9 |
| Still property (min.) | 10 | 10 | 10 | 10 | 10 | 10 | 10 | 10 | 10 | 10 | 10 | NIL | 5 |
| Formation of rust after one week's standing at 50° C. and 90% ROH | no rust | no rust | no rust | no rust | no rust | no rust | no rust | no rust | rust after 3 days | rust after 3 days | rust after 3 days | rust after 1 day | no rust |
| Output (dB) | 0 | 0 | 0 | 0 | 0 | 0 | 0 | 0 | 0 | 0 | 0 | −20 | 0 |
| Envelope | ○ | ○ | ○ | ○ | ⊚ | ○ | ○ | ⊚ | ○ | ○ | ○ | x | x |
| Friction on magnetic face side (room temp.) | 0.25 | 0.24 | 0.27 | 0.22 | 0.20 | 0.27 | 0.29 | 0.20 | 0.52 | 0.50 | 0.55 | * | 0.40 |
| Surface property (microscopic observation) | ⊚ | ⊚ | ⊚ | ⊚ | ⊚ | ⊚ | ⊚ | ⊚ | ⊚ | ⊚ | ⊚ | ⊚ | x |
| Stickiness after 1 day's standing at 40° C. and 80% RH | no | no | no | no | no | no | no | no | | | | | great |
| Still property (min.) in presence of backcoat layer | 10 | 10 | 10 | 10 | 10 | 10 | 10 | 10 | 4 | 3 | 4 | NIL | 5 |

Topcoat layer 9 (Control 5): Topcoat 1 in unmodified form.
NIL: Measurement not possible.
*: No travel due to fast adhesion.

| | Parts by weight |
|---|---|
| MEK/toluene (1/1) | 100 |

A topcoat composition shown above was applied on the ferromagnetic film 3 under the same conditions as those used for the topcoat 4, to give rise to a topcoat layer 300 Å in thickness.

| Two-layer coating Topcoat 6 | | |
|---|---|---|
| | | Parts by weight |
| A: | Butyl (2) hydroxymethacrylate phosphate | 2 |
| | MEK | 100 |

A composition (A) shown above was applied on the ferromagnetic film 1 and irradiated under the conditions of 150 KeV, 6 mA, and 3 Mrads in an atmosphere of $N_2$ gas.

| B: | Stearyl methacrylate | 0.3 |
|---|---|---|
| | Fluorine oil (by telomerization) | 0.2 |
| | MEK | 100 |

A composition (B) shown above was applied on the coat of (A) and irradiated under the conditions of 150 KeV, 4 mA, and 2 Mrads in an atmosphere of $N_2$ gas, to give rise to a topcoat 50Å in thickness.

Topcoat 7

On the composition of the topcoat 6 formed on the ferromagnetic film 2, stearyl alcohol was deposited under a vacuum of $4 \times 10^{-3}$ Torr. The coat thus obtained was 50 Å in thickness.

Topcoat 8

On the composition of the topcoat 6 formed on the ferromagnetic film 3, fluorine oil was deposited under a vacuum of $4 \times 10^{-3}$ Torr. The coat thus obtained was 50 Å in thickness.

The results of Table 1 will be discussed.

1. It is noted that the phosphate of the type curable by radiation excels the type not curable by radiation (Control 5) in still properties.

2. The effect of the present invention is evidenced by the occurrence of no rust after one week's standing under harsh conditions. The film incorporating no $O_2$ (Control 4) gathered rust after one day's standing, indicating higher susceptibility to rusting than the film incorporating $O_2$.

3. As regards friction on the magnetic surface side, the films containing oxygen (Controls 1-3) showed lower degrees of friction than the film containing no oxygen (Control 4), although these degrees of friction are not sufficiently low. Application of a topcoat is noted to lower the friction level.

4. The friction produced by the topcoat is lower in the two-layer coat (Example 6) than in the one-layer coat. Between the two-layer coats (Examples 6,9), the coat formed by the vacuum deposition showed a lower friction level than the other coat. Comparison by visual observation as aided by microscopy and photography reveals that the two-layer coat obtained by vacuum deposition excels the two-layer coat obtained by spreading in surface property. It is also noted that the two-layer coat obtained by vacuum deposition has the lowest level of friction.

The same trend is observed with respect to the envelope.

Now, the methods used for the determination of the properties described above will be described below.

1. Still properties

Recording is effected at 5 MHz and the output of reproduction is tested for still properties. A level exceeding 10 minutes is rated as acceptable.

2. Friction on magnetic surface side

A given magnetic tape is wound around a cylinder with the magnetic surface in contact with the cylinder, with a load of 20 g suspended from one end of the magnetic tape, and the cylinder is rotated by 90°. The change of tension before and after the rotation is read and reported.

3. Surface property

The surface of a given magnetic tape is visually observed through an interference microscope at 50 and 400 magnifications. The surface property is also examined with the aid of photography.

4. Output

This property is determined by the measurement of S/N ratio (absolute values) during recording and reproduction at a central frequency of 5 MHz. A VHS device is adapted, through modification of VRT, to increase the scope of measurement up to 5 MHz.

5. Rust

A given magnetic tape is left standing under the conditions of 50° C. and 90% RH for two days.

6. Test for stickiness

A given magnetic tape, about 1 m in length, is passed around a glass tube and left standing, with a weight of 500 g hung from the leading end of the tape. At the end of one day's standing, it is left at rest at room temperature for six hours and then tested for viscosity.

EXAMPLE 10-11 AND CONTROL 6-9

(1) Formation of Magnetic Layer

Ferromagnetic film 1

A ferromagnetic film was produced by following the procedure of Examples 1-9 (ferromagnetic film 1).

Ferromagnetic film 2

A ferromagnetic film was produced by following the procedure of Examples 1-9 (ferromagnetic film 2).

Ferromagnetic film 3

A ferromagnetic film was produced by following the procedure of Examples 1-9; (ferromagnetic film 3).

Ferromagnetic film (Control)

A ferromagnetic film was produced by following the procedure of Control 1-5 (control).

(2) Formation of Backcoat Layer

| Backcoat layer 1 (Thermally curable type) | Parts by weight |
| --- | --- |
| Zinc oxide, 80 m | 200 |
| Curing agent (Coronet L) | 20 |
| Lubricant (stearic acid-modified silicone) | 4 |
| (butyl stearate) | 2 |
| Nitrocellulose | 4 |
| Vinyl chloride-vinyl acetate-vinyl alcohol copolymer (produced by Sekisui Chemical and marketed under trademark designation of Eslek A) | 30 |
| Polyurethane elastomer (produced by B. F. Goodrich Corp. and marketed under trademark designation of Essen 5703) | 30 |
| Mixed solvent (MIBK/toluene) | 250 |

The components shown above were thoroughly mixed. The resulting coating material was applied on a polyester film 15 μm in thickness, dried with an infrared lamp or hot air to expel the solvent, treated fro smoothening surface, rolled up, and left standing in an oven at 80° C. for 48 hours to promote the cross-linking reaction with isocyanate.

| Backcoat layer 2 | Parts by weight |
| --- | --- |
| Carbon black, 100 mμ (produced by Asahi Carbon) | 50 |
| (A) Acryl-modified vinyl chloride-vinyl acetate-vinyl alcohol copolymer, molecular weight 45,000 | 50 |
| (B) Acryl-modified polyurethane elastomer, molecular weight 5,000 | 50 |
| Stearic acid | 2 |
| Butyl stearate | 2 |
| Mixed solvent (MIBK/toluene = 1/1) | 300 |

The components shown above were dispersed for five hours in a ball mill. The resultant mixture was applied in a thickness estimated to dry to 1 μm on the rear side of a polyester film having a magnetic surface formed in advance. The deposited mixture was irradiated with electron beam from an electrocurtain type electron beam accelerator under the conditions of 150 keV of acceleration voltage, 10 mA of electrode current, and 5 Mrads of absorption dosage in an atomsphere of $N_2$ gas, to give rise to a backcoat layer.

| Backcoat layer 3 | Parts by weight |
| --- | --- |
| Zinc sulfide with varying particle diameter | 30 |
| Carbon black | 25 |
| Acryl-modified vinyl chloride-vinyl acetate-vinyl alcohol copolymer, molecular weight 30,000 | 40 |
| Acryl-modified polyurethane elastomer, molecular weight 20,000 | 40 |
| Polyfunctional acrylate, molecular weight 1,000 | 20 |
| Oleic acid | 4 |
| Stearic methacrylate | 2 |
| Mixed solvent (MIBK/toluene) | 250 |

A backcoat layer was produced by treating the components mentioned above after the procedure of the backcoat layer 2 described above.

| Backcoat layer 4 | Parts by weight |
| --- | --- |
| $CaCO_3$, 80 mμ | 50 |
| Acryl-modified vinyl chloride-vinyl acetate-vinyl alcohol copolymer, molecular weight 30,000 | 30 |
| Acryl-modified polyurethane elastomer, molecular weight 50,000 | 30 |
| Acryl-modified phenoxy resin, molecular weight 35,000 | 20 |
| Polyfunctional acrylate, molecular weight 500 | 20 |
| Stearic acid | 4 |
| Solvent (MEK/toluene = 1/1) | 300 |

A backcoat layer was produced by treating the components shown above after the procedure of the backcoat layer 2 described above.

(3) Formation of topcoat layer

\* Topcoat composition

| Topcoat composition 1 | Parts by weight |
| --- | --- |
| 2,6-Di-tert-butyl-p-cresol | 2 |

-continued

| Topcoat composition 1 | |
|---|---|
| | Parts by weight |
| Fluorine-modified silicone stearate | 0.4 |
| MEK | 100 |
| Coronet L | 0.2 |

| Topcoat composition 2 | |
|---|---|
| | Parts by weight |
| Monoglycol salicylate acrylate | 5 |
| Myristic acid | 0.3 |
| Methacrylate of myristic alcohol | 1.0 |
| MEK/toluene (1/1) | 100 |

| Topcoat composition 3 | |
|---|---|
| | Parts by weight |
| Dimethylaminomethacrylate | 3 |
| Fluorine (electrolytic method) | 0.3 |
| MEK/toluene (1/1) | 100 |

| Topcoat composition 4 | |
|---|---|
| | Parts by weight |
| Hydroxyethyl methacrylate phosphate | 3 |
| Stearic acid | 0.5 |
| Stearic acid-modified silicone | 0.5 |
| Toluene | 100 |

| Topcoat composition 5 | |
|---|---|
| | Parts by weight |
| Stearyl alcohol methacrylate phosphate | 3 |
| Acrylate of stearic acid | 0.6 |
| MEK/toluene (1/1) | 100 |

\* Production of topcoat layer and behavior

1. The topcoat layer 1 was obtained by applying the topcoat composition 1 in its unmodified form on the ferromagnetic film (1). The thickness of the layer was 50 Å.

2. The topcoat layer 2 was obtained by applying the topcoat composition 2 on the ferromagnetic film (2) and irradiating the applied layer under the conditions of 150 KeV of acceleration voltage, 6 mA of electrode current, and Mrads of dosage in an atmosphere of $N_2$ gas. The thickness of the layer was 300 Å.

3. The topcoat layer 3 was obtained by applying the topcoat composition 3 on the ferromagnetic film (1) and irradiating the applied layer under the conditions of 150 KeV of acceleration voltage, 10 mA of electrode current, and 5 Mrads of dosage in an atmosphere of $N_2$ gas. The thickness of the layer was 100 Å.

4. The topcoat layer 4 was obtained by applying the topcoat composition 4 on the ferromagnetic film (3) and irradiating the applied layer under the conditions of 150 KeV of acceleration voltage, 10 mA of electrode current, and 5 Mrads of dosage in an atmosphere of $N_2$ gas. The thickness of the layer was 100 Å.

5. The topcoat layer 5 was obtained by applying the topcoat composition 5 on the ferromagnetic film (2) and irradiating the applied layer under the conditions of 150 KeV of acceleration voltage, 10 mA of electrode current, and 5 Mrads of dosage in an atmosphere of $N_2$ gas. The thickness of the layer was 150 Å.

| 6. Topcoat composition 6 | | |
|---|---|---|
| | | Parts by weight |
| a. | Dimethylamino methacrylate | 3 |
| | MEK/toluene (1/1) | 100 |

The composition of these components was applied on the ferromagnetic film (1) and irradiated under the conditions of 150 KeV of acceleration voltage, 10 mA of electrode current, and 5 Mrads of dosage in an atmosphere of $N_2$ gas.

| | | |
|---|---|---|
| b. | Stearyl methacrylate | 0.3 |
| | Fluorine oil (telomerization) | 0.2 |
| | MEK | 100 |

On the layer obtained as described above, the composition of these compnents was applied and irradiated under the conditions of 150 KeV of acceleration voltage, 4 mA of electrode current, and 2 Mrads of dosage in an atmosphere of $N_2$ gas. The layer consequently obtained was 110 Å in thickness.

7. On the first layer (a) of the topcoat composition 6 formed on the ferromagnetic film (2), stearyl alcohol was deposited under a vacuum of $4\times10^{-3}$ Torr. The thickness of the layer was 110 Å.

8. On the first layer (a) of the topcoat 6 formed on the ferromagnetic film (2), fluorine-modified oil was deposited under a vacuum of $4\times10^{-3}$ Torr. The thickness of the layer was 105 Å.

Control 6

The backcoat layer 1 was formed on the ferromagnetic film of the control.

Control 8

The backcoat layer 1 was formed on the ferromagnetic film 1.

EXAMPLES 10-11 1 The backcoat layer 1 was formed on the ferromagnetic film 1 and the topcoat layer 1 (Example 10) and the topcoat 3 (Example 11) were severally formed.

The properties of the produced magentic recording media are shown in Table 2.

TABLE 2

| | Example 10 | Example 11 | Control 6 | Control 7 | Control 8 | Control 9 |
|---|---|---|---|---|---|---|
| Ferromagnetic film | 1 | 1 | Control | Control | 1 | 1 |
| Backcoat layer | 1 | 1 | 1 | no | 1 | no |
| Topcoat layer | 1 | 3 | no | no | no | no |
| Initial friction at room temp. | 0.30 | 0.30 | no traveling | no traveling | 0.50 stopped at 2 times | |
| Friction after 50 | 0.40 | 0.35 | (NIL) | (NIL) | heavy | |

TABLE 2-continued

|  | Example 10 | Example 11 | Control 6 | Control 7 | Control 8 | Control 9 |
| --- | --- | --- | --- | --- | --- | --- |
| cycles of travel |  |  |  |  |  |  |
| Still property | clogging in 4 min. | clogging in 5 min. | weak, NIL | weak, NIL | scraping clogging in 0 min. | good in 10 min. |
| Contact angle (°) | 82 | 90 | 65 (40) | 40 | 80 (50) |  |
| Surface property (visual observation through microscope | xx | ∆ | ◉ | ◉ | ◉ | ◉ |
| Output (dB) | −8.0 | −1.0 | −20 | −20 | 0 | 0 |
| Formation of rust after 2 days' standing at 50° C. and 90% RH | ○ | ◉ | xx | xx | x | x |

The numerals in parentheses in the bracket "contact angle" are contact angles of the films minus the respective backcoat layers.

The results of Table 2 will be discussed.

In Example 6, the backcoat layer 1 was formed on a film in the absence of $O_2+Ar$ to develop the possibility of back-side transfer. In this case, the initial friction was too high for the magnetic tape to run. This fact evidences that the back-side transfer was ineffective in improving the friction, although it served to increase the contact angle from 40° to 65°.

The film conforming to Japanes Patent Publication SHO 57(1982)-29769 was too weak to permit determination of still properties. This fact indicates that the film itself was defective. It was found that the output was low (−20 dB) and the rust was easy to form because the Hc was low.

The $O_2$-containing film of Control 8 showed a low level of friction, though not as low as required, as compared with the film of Control 6. Thus, the test was discontinued on the second round. Also in this case, the back-side transfer increased the contact angle from 50° to 80° but it caused damage on the $O_2$-containing film transfer induced rupture of film wall during the test for still properties.

In contrast, the films provided with the topcoats of Exmaples 10 and 11 showed low levels of friction as compared with the film of Control 8 and endured 50 cycles of travel. In the still properties, they showed longer periods than the film of Control 8. Compared with the film of the radiation curable topcoat layer 3, the film of the thermally curable topcoat 1 admitted of back-side transfer and showed inferior surface property and experienced heavy output decline on the inner portion of the jumbo roll. It was confirmed that the inclusion of a rustproofing agent in the topcoat layer brought about rustproofing effect.

EXAMPLES 12–14

Varying ferromagnetic films, backcoat at layers and topcoat layers were combined as shown in Table 3 and tested for properties. The results are shown in the same table.

TABLE 3

|  | Example 12 | Example 13 | Example 14 | Control 10 | Control 11 | Control 12 |
| --- | --- | --- | --- | --- | --- | --- |
| Ferromagnetic film | 1 | 3 | a3 | b3 | 3 | 3 | Control |
| Backcoat layer | 2 | 2 | 2 | Top layer 1 | 1 | 2 | 2 |
| Topcoat layer | 3 | 4 | 1 | Back layer 2 | 1 | no | no |
| 50 cycles of travel at room temperature |  |  |  |  |  |  |  |
| Initial friction | 0.25 | 0.23 | 0.28 | 0.28 | 0.30 | 0.50 | No running (NIL) |
| Friction after 50 cycles | 0.30 | 0.27 | 0.38 | 0.38 | 0.40 | Stop at 2 times (Great scraping) |  |
| Topcoat scraping | ◉ | ◉ | ○ | ○ | ∆ |  |  |
| Backcoat scraping | ○ | ○ | ○ | ○ | ○ |  |  |
| Two days' standing at 40° C. and 80% RH |  |  |  |  |  |  |
| Friction | 0.30 | 0.30 | 0.40 | 0.40 | 0.40 |  |  |
| Output stability | ◉ | ◉ | ∆ | ○ | x |  |  |
| Dropout | 200 | 200 | 2000 | 1000 | 2000 |  |  |
| Output (dB) | 0 | 0 | −5.0 | −4.0 | −8.0 | 0 | −20 |
| Surface property (visual observation through microscope) | ◉ | ◉ | x | x | xx | ◉ |  |
| Still property (min.) | 10 | 10 | 5 | 7 | 4 (10) | 0 | NIL |
| Contact angle (°) | 70 (50) | 72 (50) | 72 (50) |  | 72 (50) | 52 (50) | 52 (50) |
| Formation of rust | ◉ | ◉ | ○ | ○ | ○ | x | xx |

Still properties: The numerals in parentheses under Control 10 represent values found of the film minus backcoat and topcoat.
Contact angle: The numerals in parentheses represent values found of the films minus backcoat and topcoat.

and the output became unstable. In the still properties, the film devoid of a backcoat (Control 9) showed a level of 10 minutes. It entailed immediate clogging as a serious problem. The film which travelled but discontinued the travel was found, by visual inspection, to have yielded to heavy scraping. In some films, the back-side The results of Table 3 will be discussed below.

1. Comparison of Control 10 and Examples 14a and 14b reveals that in Control 10, since the topcoat layer was not the radiation curable type, it did not display uniformity owing to the shrinkage of roll during thermal curing and the topcoat surface was liable to scraping. The stability of the film of Control 10 during two days' standing at 40° C. and 80% RH was inferior because the stability of the magnetic surface was impaired by the back-side transfer to the magnetic surface during the thermal curing of the backcoat layer. Even when the topcoat layer was formed thereon, the inferior output stability continued to exist and clogging occurred

EXAMPLES 15-19

On the ferromagnetic film (2), the backcoat layer 3 was formed and then a varying topcoat layer was formed thereon. The films so produced were tested for properties. The results are shown in Table 4.

TABLE 4

|  | Example 15 | Example 16 | Example 17 | Example 18 | Example 19 | Control 13 |
| --- | --- | --- | --- | --- | --- | --- |
| Ferromagnetic film | 2 | 2 | 2 | 2 | 2 | 2 |
| Backcoat layer | 3 | 3 | 3 | 3 | 3 | 2 |
| Topcoat layer | 2 | 5 | 6 | 7 | 8 | 5 |
| 50 Cycles of travel at room temperature |  |  |  |  |  |  |
| Initial friction | 0.25 | 0.25 | 0.22 | 0.20 | 0.20 | 0.25 |
| Friction after 50 cycles | 0.26 | 0.26 | 0.23 | 0.22 | 0.22 | 0.30 |
| Topcoat scraping | ◎ | ◎ | ◎ | ◎ | ◎ | ◎ |
| Backcoat scraping | ◎ | ◎ | ◎ | ◎ | ◎ | O |
| Drop out | 150 | 150 | 140 | 140 | 140 | 500 |
| Two days' standing at 40° C. and 80% RH |  |  |  |  |  |  |
| Friction | 0.26 | 0.26 | 0.23 | 0.23 | 0.23 | 0.40 |
| Out stability | ◎ | ◎ | ◎ | ◎ | ◎ | Δ |
| Dropout | 120 | 120 | 110 | 110 | 110 | 500 |
| Putout (dB) | 0 | 0 | 0 | 0 | 0 | 0 |
| Surface property (visual observation through microscope) | ◎ | ◎ | ◎ | ◎ | ◎ | ◎ |
| Still property (min) | 10 | 10 | 10 | 10 | 10 | 10 |
| Formation of rust | O | ◎ | ◎ | ◎ | ◎ | ◎ | readily. The topcoat layer remained uncured during the course of thermal curing and was liable to clogging under the influence of back-side transfer.

In Example 14, since the backcoat layer was of the radiation-curable type, it avoided the shrinkage suffered by the film of Control 10 during the course of thermal curing. Thus, only the topcoat layer 1 yielded to the effect of thermal curing. Consequently, the topcoat layer was less susceptible of scraping and the output stability was high. The degradation of electric properties was not so heavy as in Control 10.

As regards the method for the formation of the backcoat and topcoat layers, the effect from the backcoat layer was smaller and the output stability was better when the topcoat layer was formed first as in Example 14b than otherwise. When the topcoat layer is formed first by reason of the convenience of process, since the topcoat layer is liable to scraping during the formation of the backcoat layer, this process of backcoat fomation must be controlled rigidly.

2. Comparison of Examples 14a and 14b and Examples 12-13 reveals that the films of the radiation curable type sh.owed lower levels of friction and the topcoat layers of these films were less susceptible of scraping. Since the layers suited on-line operation, the films sufferred no back-side transfer and showed better output stability. Since no shrinkage occurred during the thermal curing, the topcoat layers enjoyed good surface property and entailed no output decline. Because of the absence of the effect of shrinkage, the films were rated high in terms of dropout. In the still properties, desirable results exceeding 10 minutes were obtained because of the absence of the effect of back-side transfer. They also manifested desirable rustproofing property.

In the case of the films designed to be exposed to radiation on both sides, the order in which the backcoat layer and the topcoat layer are formed does not matter.

The results of Table 4 will be discussed below. 1. As regards the travel at room temperature, the film using the backcoat layer 3 showed no conspicuous increase of friction after 50 cycles of travel. They entailed absolutely no scraping of backcoat layer. Consequently, they suffered minimal dropout. 2. In the standing at 50° C. and 80% RH, the film of Control 6 showed a high friction coefficient and consequently lacked output stability and entailed heavy dropout. The films formed of three components showed desirable results in friction, output stability, and dropout. 3. The films invariably showed desirable results in electric output, surface property, and still properties. The films using a backcoat of three component were found to excel those films not using this backcoat. 4. The film of two-layer coating in Exmple 17 was found to show a lower frinction coefficient due to more desirable lubrication than the film of one-layer coating. The topcoat formed by the vacuum deposition was found to give desirable performance owing to the effect of the two-layer coating. When the surface property was examined through visual observation aided by microscopy, the topcoat formed by the vacuum deposition enjoyed the most desirable surface property. It is also noted that the film using this topcoat showed the lowest level of friction and the most desirable rustproofing property.

EXAMPLE 20

The procedure of Example 14 was followed, except that 1 part of benzoin ethyl ether was dissolved and applied and cured under an ultraviolet lamp (80 W of output and 1 cm of available tube length) at a line speed of 30 m per second.

EXAMPLE 21

The procedure of Exmaple 14 was followed, except that 2 parts of benzophenone was dissolved and applied and cured under an ultraviolet lamp (80 W of output and 1 cm of available tube length) at a line speed of 30 m per minute.

The properties of the produced films are shown in Table 5. It is noted from the table that the films of the type curable by ultraviolet light had good results.

TABLE 5

|  |  | Example 20 | Example 21 |
|---|---|---|---|
| Travelling at room temperature | Initial friction | 0.25 | 0.25 |
|  | Friction after 50 cycles of travel | 0.27 | 0.27 |
|  | Scraping of topcoat | ◎ | ◎ |
|  | Scraping of backcoat | ◎ | ◎ |
|  | Dropout | 200 | 210 |
| Two days' standing at 50° C. and 80% RH | Friction | 0.27 | 0.27 |
|  | Output stability | O | O |
|  | Dropout | 210 | 220 |
| Output (dB) |  | 0 | 0 |
| Surface property (visual observation through microscope) |  | ◎ | ◎ |
| Still properties |  | 10 | 10 |
| Formation of rust |  | 0 | 0 |

The methods adopted for the determination of the properties indicated in Tables 2–5 will be described below.

1. Still properties:

Recording is effected at 5 MHz and the output of reproduction is tested for still properties. A level exceeding 10 minutes is rated as acceptable.

2. Travelling at room temperature:

With a commercially available VHS type VTR suitably remodelled, a given sample is tested for initial friction and friction after travelling. The measurement of friction is effected with a tension analyzer incorporated in the deck.

3. Contact angle:

With a projection type measuring instrument, a fixed volume of water drop is dropped from an injection syrings and the angle of contact is read out from a projector within one minute of dropping.

4. Surface property:

The surface of a given magnetic tape is visually observed through an interference microscope at 50 and 400 magnifications. The surface property is also examined with the aid of photography.

5. Output:

This property is determined by the measurement of S/N ratio (absolute value) during recording and reproduction at a central frequency of 5 MHz. A VHS device is adapted, through modification of VTR, to increase the scope of measurement up to 5 MHz.

6. Rust:

A given magnetic tape is left standing under the conditions of 50° C. and 90% RH for two days.

7. Scraping of backcoat and topcoat surfaces:

With a commercially available VHS type VTR suitably remodelled, the backcoat and the topcoat of a given tape is examined for possible surface scraping after 50 cycles of travel. The results of backcoat are rated by the four-point scale, wherein ◎ denotes high cleanliness, O freedom from dirtiness, Δ fair degree of dirtiness, and x heavy degree of dirtiness. The results of topcoat are rated similarly by the four-point scale, wherein ◎ absence of scraping, O a low degree of dirtiness, Δ a medium degree of dirtiness, and x a heavy degree of dirtiness.

8. Two days' standing at 40° C. and 80% RH:

The measurement of friction is made with a tension analyzer incorporated in the deck.

The measurement of output stability is made after elapse of a stated length of time.

Dropout - Singles of a single mode at 5 MHz are recorded on a given tape by the use of a VHS deck under the conditions of 20 ° C. and 60% RH. The signals are reproduced, during which period count is taken of the number of intervals of more than 15μ seconds in which the reproduced signals remain at least 18 db below the average reproduction level. The total number of these intervals is found per minute on a total of ten samples. The dropout is reported in the form of the average of the total mentioned above.

What is claimed is:

1. A magnetic recording medium comprising a nonmagnetic substrate, a feromagnetic film of the nonbinder type formed on one side of said substrate; and, on the surface of the magnetic recording layer, a topcoat layer from 10 anqstroms to 100 angstroms thick comprising a lubricant and an antioxidant which is a phosphoric ester of the type curable by radiation.

2. A magnetic recording medium according to claim 1, wherein the topcoat layer is formed by applying a mixture of said radiation curable phosphoric ester and said lubricant.

3. A magnetic recording medium according to claim 1, wherein the topcoat layer comprises two layers a first layer which is applied directly to the ferromagnetic film and contains the radiation curable phosphoric ester, and a second layer which is applied to the first layer and contains the lubricant.

4. A magnetic recording medium according to claim 1, wherein the lubricant is curable by radiation.

5. A magnetic recording medium according to claim 1, which further comprises a backcoat layer formed of an applied coat containing an inorganic pigment, an organic binder, and a lubricant and deposited on the opposite side of said non-magnetic substrate.

6. A magnetic recording medium according to claim 5, wherein said organic binder of said backcoat layer is of the curable type.

7. A magnetic recording medium according to claim 5, wherein said lubricant in said topcoat layer and said backcoat layer contains a radiation curable lubricant.

* * * * *